United States Patent [19]
Bane

[11] Patent Number: 5,493,716
[45] Date of Patent: Feb. 20, 1996

[54] METHOD OF OPERATING A RADIO

[75] Inventor: Ronald L. Bane, Stone Mountain, Ga.

[73] Assignee: Motorola, Inc., Schaumburg, Ill.

[21] Appl. No.: 227,822

[22] Filed: Apr. 14, 1994

[51] Int. Cl.⁶ ..................................................... H04B 1/16
[52] U.S. Cl. ........................ 455/296; 455/229; 455/302; 455/317
[58] Field of Search ............................ 455/226.1, 226.2, 455/227, 229, 296, 302, 310, 315, 317, 343, 295

[56] References Cited

U.S. PATENT DOCUMENTS

| | | |
|---|---|---|
| 3,372,339 | 3/1968 | Harrison et al. . |
| 3,414,821 | 12/1968 | Bickers et al. . |
| 4,063,173 | 12/1977 | Nelson et al. . |
| 4,152,669 | 5/1979 | Igarashi ..................................... 331/16 |
| 4,198,604 | 4/1980 | Holdaway ............................... 455/260 |
| 4,322,856 | 3/1982 | Ohta et al. ............................. 455/189.1 |
| 4,340,974 | 7/1982 | Cooke et al. ............................ 455/258 |
| 4,395,777 | 7/1983 | Oki et al. ................................ 455/183.2 |
| 4,512,035 | 4/1985 | Victor et al. ........................... 455/165.1 |
| 4,551,856 | 11/1985 | Victor et al. .......................... 455/183.2 |

FOREIGN PATENT DOCUMENTS

| | | |
|---|---|---|
| 55-12536 | 3/1980 | Japan . |
| 3-76320 | 4/1991 | Japan ..................................... 455/315 |

Primary Examiner—Chi H. Pham
Attorney, Agent, or Firm—Daniel K. Nichols; Kenneth M. Massaroni

[57] ABSTRACT

A radio (100), powered by a battery (170), can be used in remote meter reading applications. In order to conserve battery power, the radio (100) is capable of determining that a signal is an image signal rather than a signal on the desired frequency. This is accomplished by attempting to receive a signal utilizing different local oscillator signals (high side injection and low side injection). If a signal is present, as indicated by the received signal strength with both local oscillator signals, then the radio (100) will attempt to decode data. The radio (100) does not attempt to decode data when the signal is determined to be a spurious signal. The radio (100) can then be operated in a reduced power consumption mode. This results in battery savings for radios operating in the presence of an image frequency signal.

9 Claims, 2 Drawing Sheets

મ5,493,716

METHOD OF OPERATING A RADIO

TECHNICAL FIELD

This invention relates to radios in general and particularly to radios in which the receiver local oscillator is selectable.

BACKGROUND

Radio receivers are susceptible to reception of spurious signals, such as that of an image frequency signal due, to the architecture and mixing products within the receiver. An image signal is a signal which, due to its relationship to the desired received signal and the local oscillator frequency, mixes to the IF (intermediate frequency) of the radio. For example, if it is desired to receive a signal having a frequency of 150 MHz and the receiver's IF frequency is 10.7 MHz, a local oscillator signal that is equal either to the sum or the difference between the desired receive frequency and the IF frequency would be utilized. In this example, the local oscillator signal would either be 160.7 MHz or 139.3 MHz in order to tune the receiver to 150 MHz. If the high side injection is used (160.7 MHz), not only would the desired frequency of 150 MHz mix to the IF frequency of 10.7 MHz, but a signal of 171.4 MHz would also be mixed to the receiver's IF frequency. Once an undesired frequency has been mixed to the radio IF frequency, it cannot be distinguished from a desired signal.

In addition to image signals, other spurious signals can disrupt the desired operation of a receiver. For example, mixing products within a radio, which are sometimes referred to as "self-quieters," can also disrupt the desired reception. Unlike an image signal, it may be possible to predict such self-quieters and a radio can be programmed on a channel-by-channel basis to utilize a local oscillator frequency that does not produce a spurious problem at a particular desired receive frequency. Such an approach is disclosed in both U.S. Pat. Nos. 4,512,035 and 4,551,856, the disclosures of which are hereby incorporated by reference. Such preprogramming is effective when it is possible to predict the actual presence of signals that may cause spurious responses due to mixing action. While this approach can be used to avoid self-quieting signals, mixing products from external signals, such as on the image frequency, cannot be so easily avoided since any superheterodyne receiver will have an image frequency for every desired receive frequency, regardless of the chosen local oscillator frequency. A receiver operating in the field is subject to whatever RF signals happen be present at the location of the radio.

DETAILED DESCRIPTION OF THE PREFERRED EMBODIMENT

Figure 1:
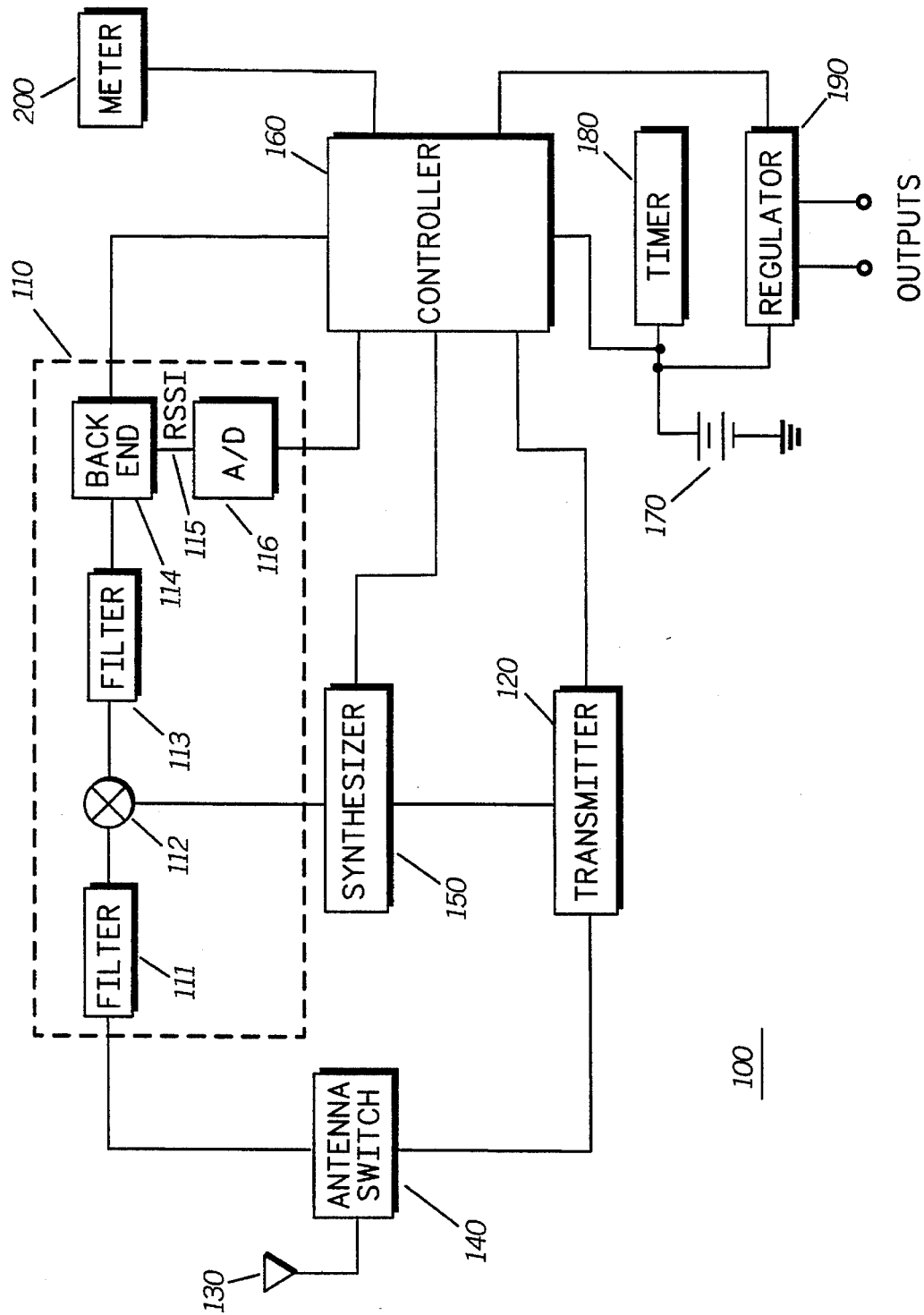
FIG. 1 is a block diagram of a radio in accordance with the present invention.

Referring now to FIG. 1, it will be understood that a radio generally indicated by 100 includes a receiver section 110 and a transmitter section 120, which are selectively connected to an antenna 130 as by an antenna switch 140. As is conventional, a frequency synthesizer 150 is utilized both for providing the RF oscillator signal to the transmitter 120, as well as the local oscillator signal to the receiver 110. The radio 100, of the preferred embodiment, is controlled by a controller 160, which is preferably a microprocessor or the like. The controller 160 controls the operation of the various radio components, including the transmitter 120, receiver 110, antenna switch 140, and supplies control information to the synthesizer 150 to select the frequency output of the synthesizer 150. In the preferred embodiment, the radio 100 is designed to interface to a meter 200, which can be an electric utility meter, water meter, or other device, which is desired to be read remotely. In this application, radio 100 is powered as by a battery 170. In order to conserve energy and prolong the operating life of the battery 170, the radio is only operated periodically to look for the presence of predetermined signals. This operation is controlled by a timer 180, powered by the battery 170, which periodically actuates the controller 160. A regulator 190, powered by battery 170 and selectively activated by the controller 160, has outputs for powering the other portions of the radio 100.

The receiver 110 is shown in further block detail. As illustrated, received RF signals from antenna 130 are applied by the antenna switch 140 to a front end filter 111. The frequency synthesizer 150 constitutes an RF signal generator for providing local oscillator signals. Received signals are then mixed with the local oscillator signal in mixer 112 to produce an IF signal. The IF signal is filtered by filter 113 before being applied to conventional receiver back end circuitry 114. This back end circuitry 114 is utilized to detect and/or demodulate the received signal. If the demodulated signal is a data string, it can be applied to the controller 160. Additionally, an analog signal, which is indicative of the received signal strength (RSSI), is provided at an output 115 of the receiver back end. This RSSI signal is applied to an analog-to-digital converter (A/D) 116, having its digital output applied to the controller 160.

As heretofore described, the operation of the receiver 110 is conventional. In applications such as remote meter reading, battery saving or the limitation of current consumption may be critical. It is desirable to limit the "on" time of the receiver 110. In such applications, the timer 180 periodically actuates the controller 160 which activates the regulator 190 to power the various portions of the radio 100. The controller 160 activates the receiver 110 to monitor a channel for data directed to the radio 100. Such data could be a request to transmit meter information. As is conventional, in attempting to detect the presence of a signal addressed to the radio 100, the radio would first determine whether a signal is present on the desired receive channel. This is accomplished by detecting a RSSI output indicative of the presence of a signal. Detecting the presence of such a signal on the channel can be accomplished quickly with little current consumption. If a signal is present on the channel, then controller 160 would attempt to decode data from the signal, in order to determine if the signal is a command to the radio 100. Decoding of such data is a more time consuming and energy consumptive activity. The radio 100 is capable of determining if the received signal is a spurious signal, such as an image signal. If the signal is spurious, it is not necessary to attempt to decode data from the received signal. The controller 160 can activate the regulator 190 to place the radio back into a sleep or energy efficient mode of operation, awaiting the next activation by the timer 180.

Figure 2:
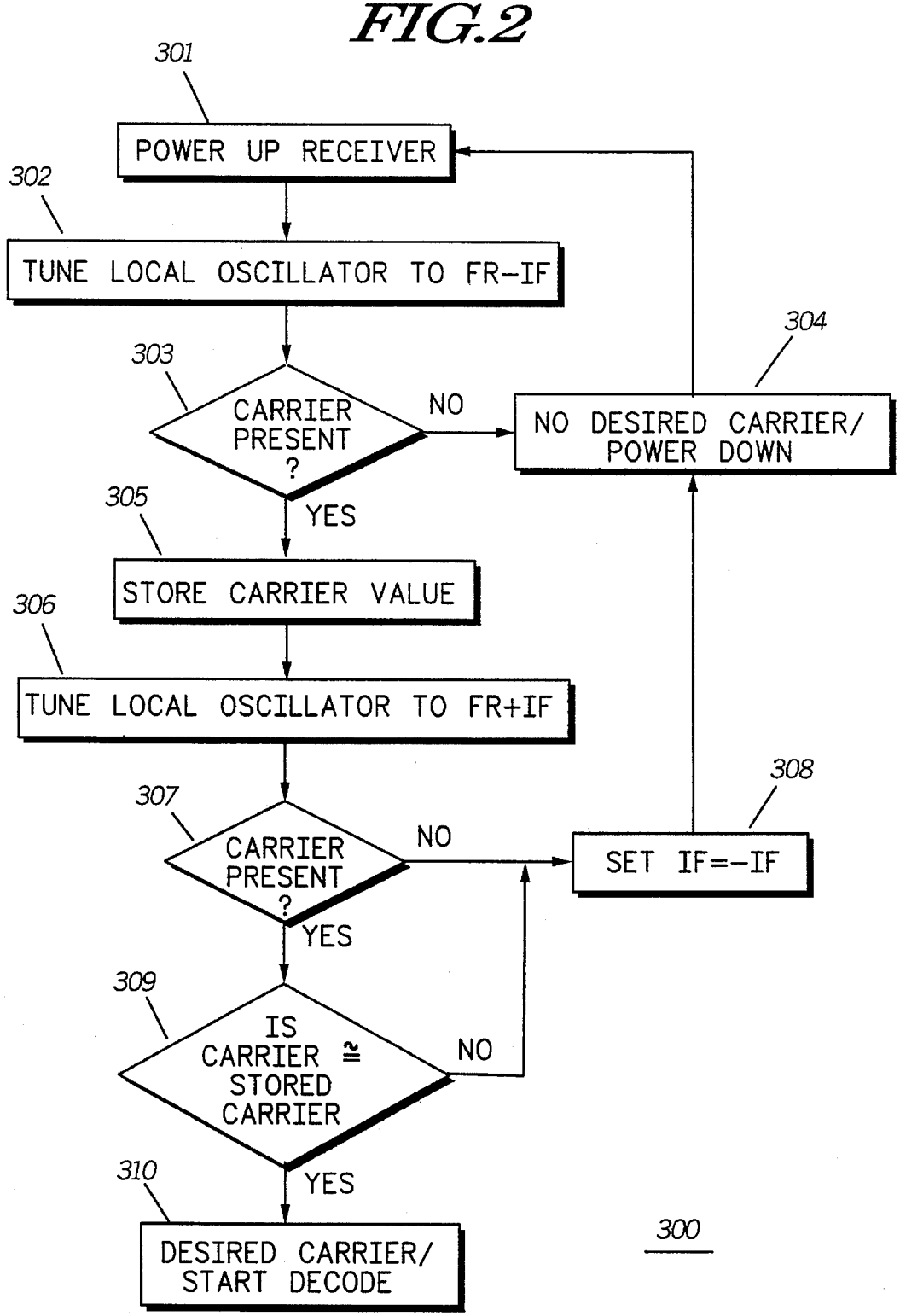
FIG. 2 is a flow chart of the operation of the radio of FIG. 1 in regard to adjustment of its local oscillator signal.

The operation of the receiver 110 is illustrated in FIG. 2. At block 301, the radio 100 is powered up as by the timer 180 activating the regulator 190. The receiver 110 is then tuned to receive or monitor a desired channel or frequency. This is accomplished by the synthesizer 150 being activated to provide an appropriate local oscillator (lo) frequency signal. The lo signal, as illustrated in block 302, is a low side injection frequency. The controller 160 would then determine whether or not a signal is present based upon the RSSI output of the receiver back end 114, as illustrated in decision block 303. If a carrier signal is not present, the radio can power down, as illustrated in block 304, and return to the power up receiver block for next activation by the timer 180.

If a carrier is present, it may not be indicative of a desired signal, but could be an image or other spurious signal. The controller 160, in the preferred embodiment stores a carrier value for the received signal based upon the output of the A/D 116, as illustrated in block 305. The controller 160 then activates the synthesizer 150 to provide an alternative local oscillator signal, in this case a high side injection signal, to the mixer 112. The desired channel is then monitored while utilizing the different lo signal. A determination is then made at decision block 307 as to whether or not a carrier is present, based upon the RSSI signal 115. If a signal is not present, this is an indication that the prior signal received with the other local side injection corresponds to a spurious signal. As such, if desired, the lo frequency can be changed back to low side injection, block 301, and the radio return to its power down mode in block 304. However, if a carrier has been detected at block 307, a signal on the desired receive frequency is likely present. An optional comparison can be made with the value of the present RSSI signal and stored value of the prior RSSI signal. If they are not approximately equal, as determined in decision block 309, this is an indication that the signals are spurious and not the desired signal, and the radio can return to its power down condition. If the carrier signals are approximately or substantially equal, this is indicative of the signal being present on the desired receive frequency, and the radio can go into a decode mode, block 310, in which the controller 160 attempts to decode the presence of data directed to the receiver 110.

The approach of determining that a signal is not an image signal can be applied to other radio applications besides the illustrated data application. In a carrier squelch operated radio, the radio can remain muted until it is determined that a signal is not an image signal, then the radio can be unmuted to receive a voice signal. Likewise, in a coded squelch radio, prior to attempting to decode a subaudible tone, data word or other selective call information, the radio can determine the validity of the signal. In applications, such as the scanning of channels, the avoidance of unsquelching or attempting to decode image signals may be very desirable.

While the preferred embodiment of the invention utilizes low side injection when first attempting to receive the signal, it will be appreciated that steps 302 and 306 can be reversed. The radio 100 could first check the desired receive frequency utilizing the local oscillator signal which did not previously result in the indication of the presence of a signal. Another alternative approach involves the shifting of the intermediate frequency (IF) of the receiver 110. This approach would necessitate the changing of the local oscillator frequency, thereby providing other opportunities to avoid spurious receiver responses.

In operation, the radio 100 only enters the power consumptive data decoded mode of operation if a signal has been detected while utilizing two different local oscillator frequencies. It will be appreciated that if the radio 100 is located in the presence of a signal at its image frequency, substantial battery saving will be obtained compared to the situation that would occur if it was necessary to attempt to decode data every time the receiver 110 was activated (due to the presence of the image frequency signal). In an application such as remote meter reading where long battery life, e.g. five years, is desired, this approach can greatly prolong the operating life of the battery 170 for the radios which are frequently subject to image frequency signals.

What is claimed is:

1. A method of operating a radio to avoid spurious response on a desired receive frequency, comprising the steps of:

monitoring the desired receive frequency utilizing a local oscillator signal, and upon detecting a signal on the desired receive frequency, monitoring said desired receive frequency utilizing an alternative local oscillator signal, and upon detecting a signal while utilizing said alternative local oscillator signal, attempting to decode the received signal.

2. A method of operating a radio to avoid spurious response, as defined in claim 1, including further the step of:

upon detecting the absence of a signal while utilizing said alternative local oscillator signal, placing the radio into an energy efficient mode.

3. A method of operating a radio to avoid spurious response as defined in claim 1, in which one of said monitoring steps uses a high side local oscillator signal and the other of said monitoring steps uses a low side local oscillator signal.

4. A method of operating a radio comprising:

detecting a signal on a desired channel while utilizing a local oscillator signal, utilizing an alternative local oscillator signal to attempt to detect a signal on the desired channel, and only when a signal is detected using both of said local oscillator signals, operating the radio to receive the signal.

5. A method of operating a radio as defined in claim 4, comprising the further steps of:

determining the signal strength of the received signal when utilizing the local oscillator signal, and determining the signal strength of the received signal when utilizing the alternative local oscillator signal.

6. A method of operating a radio as defined in claim 4, including the further step of:

when a signal is not detected using both of said local oscillator signals, placing the radio into an energy efficient mode.

7. A method of operating a radio comprising:

detecting a signal on a desired channel while utilizing a first local oscillator signal, determining the signal strength of the signal while utilizing the first oscillator signal, utilizing a second local oscillator signal to attempt to detect a signal on the desired channel, determining the signal strength of the received signal when utilizing the second oscillator signal, and determining whether the first and second received signal strengths are substantially equal and only then operating the radio to receive the signal.

8. A method of operating a remote meter reading radio, comprising the steps of:

periodically powering up the receiver, tuning the receiver to a desired receive frequency utilizing a local oscillator signal, if a signal is present, utilizing a alternative local oscillator signal to tune the radio to the desired frequency, and if a signal is present when the alternative local oscillator signal is utilized, then attempting to decode data from the received signal.

9. A method of operating a remote meter reading radio as defined in claim 8, comprising the further step of:

if a signal is not present when the alternative local oscillator signal is utilized, then powering down the receiver.

* * * * *